US009143645B2

(12) United States Patent
Goda

(10) Patent No.: US 9,143,645 B2
(45) Date of Patent: Sep. 22, 2015

(54) IMAGE PROCESSING APPARATUS FOR REMOTELY MANAGING A POWER SOURCE, METHOD FOR CONTROLLING THE SAME, AND A STORAGE MEDIUM

(75) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 13/529,984

(22) Filed: Jun. 21, 2012

(65) Prior Publication Data

US 2013/0010318 A1     Jan. 10, 2013

(30) Foreign Application Priority Data

Jul. 6, 2011     (JP) .................................. 2011-150338

(51) Int. Cl.
*G06F 3/12*        (2006.01)
*H04N 1/00*        (2006.01)
*G06K 15/00*       (2006.01)

(52) U.S. Cl.
CPC ....... *H04N 1/00891* (2013.01); *H04N 1/00896* (2013.01)

(58) Field of Classification Search
CPC ....... G06F 3/12; G06F 3/1278; G06F 3/1203; G06F 3/1204; G06F 3/1294; G06F 1/3203; G06F 1/3215; G06F 1/3265; Y02B 60/1267
USPC ............... 358/1.1, 1.9, 1.13, 1.14, 1.15, 1.18; 399/13.75; 713/300, 310, 324; 348/372
See application file for complete search history.

(56) References Cited

U.S. PATENT DOCUMENTS

| | | | |
|---|---|---|---|
| 6,937,353 B2 | 8/2005 | Iizuka et al. | |
| 7,392,409 B2 | 6/2008 | Tateyama | |
| 7,519,289 B2 | 4/2009 | Sakurai | |
| 8,254,777 B2 * | 8/2012 | Sakurai | 396/303 |
| 8,296,594 B2 | 10/2012 | Okuzono et al. | |
| 8,476,787 B2 * | 7/2013 | Spitaels et al. | 307/64 |
| 2001/0043353 A1 * | 11/2001 | Iizuka et al. | 358/1.14 |
| 2003/0025930 A1 * | 2/2003 | Tateyama | 358/1.14 |
| 2007/0086451 A1 * | 4/2007 | Sato et al. | 370/389 |
| 2009/0074430 A1 * | 3/2009 | Nakazato et al. | 399/13 |

FOREIGN PATENT DOCUMENTS

| | | |
|---|---|---|
| CN | 1225461 A | 8/1999 |
| CN | 1867046 A | 11/2006 |

(Continued)

OTHER PUBLICATIONS

Chinese Office Action dated Aug. 5, 2014 for counterpart Chinese Appln No. 201210236217.3.

*Primary Examiner* — Gabriel Garcia
(74) *Attorney, Agent, or Firm* — Fitzpatrick, Cella, Harper & Scinto

(57) ABSTRACT

This invention provides an image processing apparatus which keeps energizing some loads to reduce next startup processing at the time of power OFF operation via a switch of the apparatus while stopping power supply to all the loads at the time of power OFF operation by remote control, a control method for the apparatus, and a program. To accomplish this, this image processing apparatus is shifted to the power OFF state upon, for example, receiving an instruction for decreasing power consumption from an external apparatus, and is shifted to the quick OFF state upon receiving an instruction for decreasing power consumption from the external apparatus.

24 Claims, 15 Drawing Sheets

(56) References Cited

FOREIGN PATENT DOCUMENTS

| | | |
|---|---|---|
| JP | 2001-216118 | 8/2001 |
| JP | 2010-152709 A | 7/2010 |
| JP | 2011-003067 A | 1/2011 |
| WO | 2011/016080 A | 2/2011 |

* cited by examiner

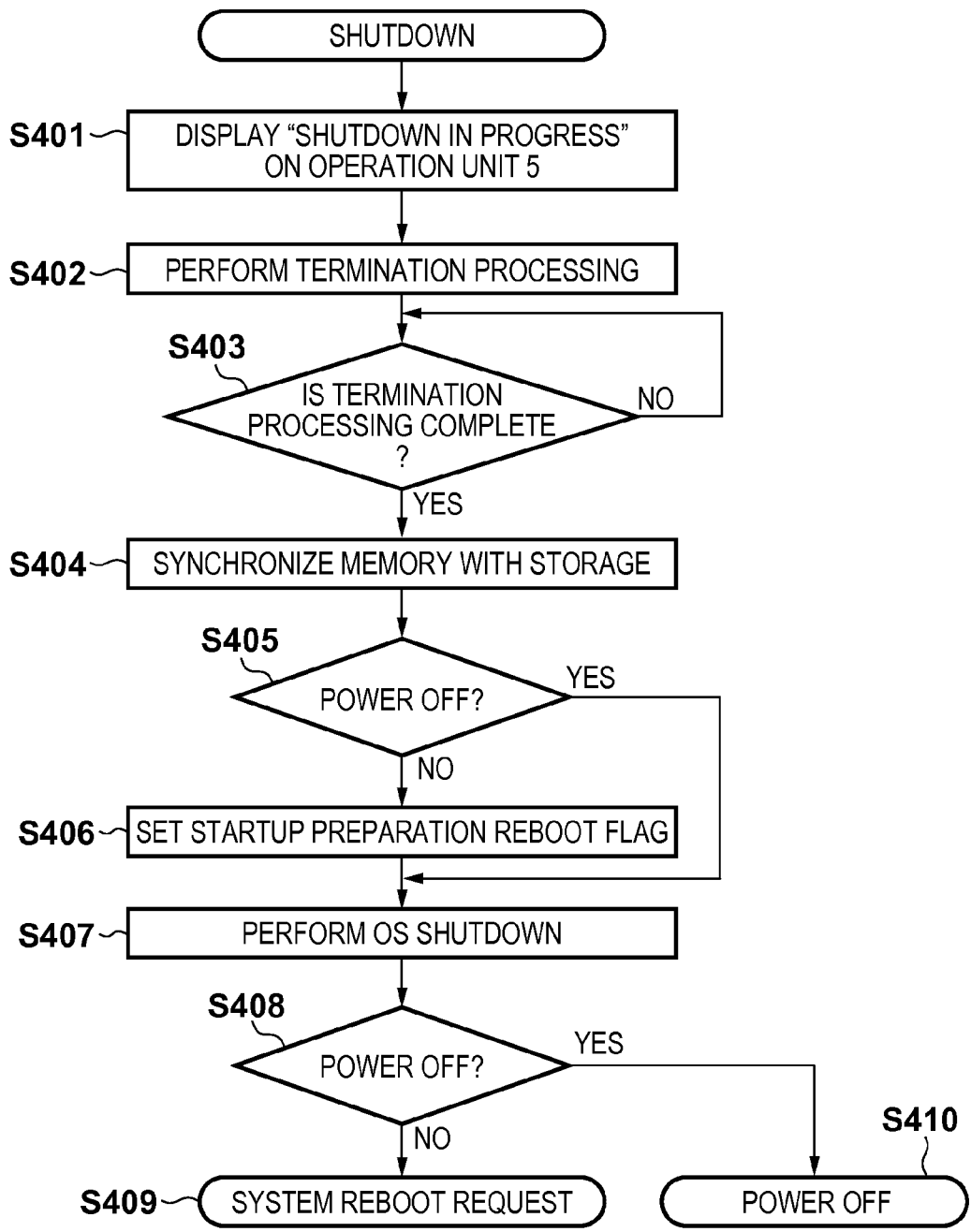
F I G. 4

IMAGE PROCESSING APPARATUS FOR REMOTELY MANAGING A POWER SOURCE, METHOD FOR CONTROLLING THE SAME, AND A STORAGE MEDIUM

BACKGROUND OF THE INVENTION

1. Field of the Invention

The present invention relates to an image processing apparatus which can remotely manage a power source, a method for controlling the same, and a storage medium.

2. Description of the Related Art

In an environment in which many image processing apparatuses are operated while connected to a network, it is required to use a method for performing intensive power management for these image processing apparatuses. For example, when taking a long vacation, a company may need to turn off the power sources of all image processing apparatuses before the vacation. In addition, when electric service is planned to be interrupted, there is a need for the manager to turn off the power sources of all the image processing apparatuses. On the other hand, there is known a conventional technique of allowing the manager to shut down a plurality of image processing apparatuses connected to a network by remote control via the network. For example, Japanese Patent Laid-Open No. 2001-216118 has proposed a technique of managing power source information of all or some of image forming apparatuses connected to a network and allowing to make ON/OFF setting for the power source of each image forming apparatus, thereby comprehensively managing the usage of each image forming apparatus.

The conventional techniques, however, have the following problems. There is a tendency for recent image processing apparatuses to take a long time to enable users to actually operate the apparatuses after they operate the power switches because of a tendency toward an increasing number of functions. One of the reasons for this kind of problem is that software for operating a controller to control an image processing apparatus increases in size along with an increase in the number of functions. In contrast to this, there is a technique available for keeping part of a controller including a memory energized; that is, keeping the controller in a kind of standby state without actually turning off the power source of the overall apparatus when the user performs a power-OFF operation. This allows the image processing apparatus to be set in an operative state within a short period of time by using the contents of the memory when the user performs the next power-ON operation.

Combining the conventional remote control shutdown technique with the image processing apparatus using the above technique will give rise to the problem of the apparatus shifting to the standby state even if the manager wants to turn off the power source. In this standby state, since part of the controller is in an energized state, the power source of the image processing apparatus is not completely turned off. A power failure in such an incomplete power OFF state may cause a failure in the image processing apparatus. Such an operation is therefore undesirable as a remote control shutdown operation.

SUMMARY OF THE INVENTION

The present invention enables realization of an image processing apparatus which keeps energizing some loads to reduce next startup processing at the time of power OFF operation via a switch of the apparatus while stopping power supply to all the loads at the time of power OFF operation by remote control; a control method for the apparatus; and a storage medium.

One aspect of the present invention provides an image processing apparatus which is configured to execute, an operation of shifting to a first state in which power supply to the image processing apparatus is stopped and an operation of shifting to a second state in which power supply to some of loads of the image processing apparatus is stopped, the apparatus comprising: a determination unit that determines whether an instruction to decrease power consumption of the image processing apparatus has been received from an external apparatus; and a control unit that shifts the image processing apparatus to the first state if the determination unit determines that the instruction has been received from the external apparatus, and shifts the image processing apparatus to the second state if the determination unit determines that the instruction has not been received from the external apparatus.

Another aspect of the present invention provides a method for controlling an image processing apparatus which is configured to execute, an operation of shifting to a first state in which power supply to the image processing apparatus is stopped and an operation of shifting to a second state in which power is supplied to some of loads of the image processing apparatus, the method comprising: determining whether an instruction to decrease power consumption of the image processing apparatus has been received from an external apparatus; and shifting the image processing apparatus to the first state if it is determined in the determining that the instruction has been received from the external apparatus, and shifting the image processing apparatus to the second state if the determination step determines that the instruction has not been received from the external apparatus.

Still another aspect of the present invention provides a computer-readable storage medium storing a computer program for causing a computer to execute each step in a method for controlling the image processing apparatus.

Further features of the present invention will be apparent from the following description of exemplary embodiments with reference to the attached drawings.

BRIEF DESCRIPTION OF THE DRAWINGS

FIG. 4 is a flowchart showing a processing procedure at the time of shutdown in the image processing apparatus according to the first embodiment;

DESCRIPTION OF THE EMBODIMENTS

Figure 1:
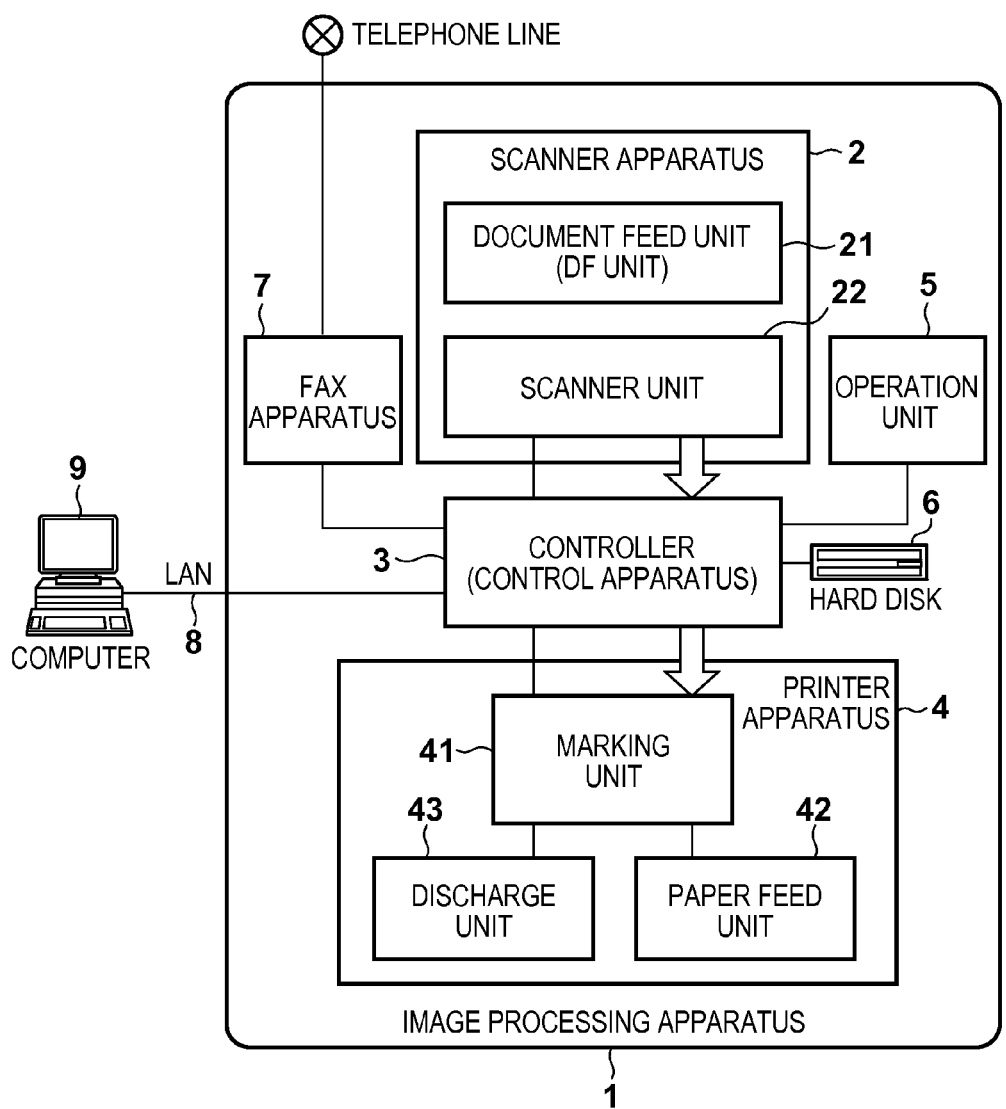
FIG. 1 is a block diagram showing an example of the arrangement of an image processing apparatus according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Arrangement of Image Processing Apparatus>

The first embodiment will be described below with reference to FIGS. 1 to 7. An example of the arrangement of an image processing apparatus 1 according to this embodiment will be described first with reference to FIG. 1. The image processing apparatus 1 includes a scanner apparatus 2, a controller 3, a printer apparatus 4, an operation unit 5, a hard disk 6, and a FAX apparatus 7. The scanner apparatus 2 optically reads an image from a document and converts the read image into a digital image. The scanner apparatus 2 includes a document feed unit 21 which can automatically and sequentially switch document bundles and a scanner unit 22 which optically scans a document and converts the scanned image into a digital image and transmits the converted image data to the controller 3. The printer apparatus 4 outputs the digital image to a paper medium. The printer apparatus 4 includes a paper feed unit 42 which can sequentially feed sheets from a sheet bundle one by one, a marking unit 41 for printing image data on a fed sheet, and a discharge unit 43 for discharging a printed sheet.

The operation unit 5 is an interface for operating the image processing apparatus 1. The operation unit 5 includes operation buttons and a display panel (none of which are shown) for issuing an instruction to copy an image and the like with respect to the image processing apparatus 1 and presenting various kinds of information to the user. The hard disk 6 stores digital images, control programs, and the like. The FAX apparatus 7 transmits a digital image to a telephone line or the like. The controller 3 is connected to each module and can execute a job on the image processing apparatus 1 by issuing an instruction to each module. The image processing apparatus 1 can receive a digital image from a computer 9, output a digital image to the computer 9, issue a job, and issue instructions for devices, including an instruction for power source management, via a LAN 8.

The image processing apparatus 1 can execute various kinds of jobs. The following are examples:

Copy Function

The apparatus records the image read from the scanner apparatus 2 on the hard disk 6 and simultaneously prints the image by using the printer apparatus 4.

Image Transmission Function

The apparatus transmits the image read from the scanner apparatus 2 to the computer 9 via the LAN 8.

The apparatus records the image read from the scanner apparatus 2 with an image save function on the hard disk 6, and performs image transmission or image printing as needed.

Image Print Function

The apparatus analyzes, for example, the page description language transmitted from the computer 9, and prints the resultant image by using the printer apparatus 4.

<Circuit Arrangement of Controller>

The circuit arrangement of the controller 3 will be described next with reference to FIG. 2. The controller 3 as a module to which the present invention is applied in a concrete manner will be described next with reference to FIG. 2.

The controller 3 includes a main board 200 and a sub-board 220. The main board 200 is a so-called general-purpose CPU system, and includes a CPU 201, a boot ROM 202, a memory 203, a bus controller 204, a nonvolatile memory 205, a disk controller 206, a flash disk 207, a USB controller 208, and a network interface 210. The CPU 201 controls the overall board. The boot ROM 202 contains a boot program called a BIOS. The memory 203 is used as a work memory by the CPU 201. The bus controller 204 has a bridge function for an external bus. The nonvolatile memory 205 retains information even when the power source is interrupted. The disk controller 206 controls a storage device. The flash disk (SSD or the like) 207 is a storage device formed from a semiconductor device and having a relatively small capacity. The USB controller 208 controls a USB. The flash disk 207 stores an operating system (OS) and executable programs such as firmware which are executed by the CPU 201. A USB memory 209, the operation unit 5, the hard disk 6, and the like are externally connected to the main board 200. The LAN 8 is also connected to the main board 200 via the network interface 210.

The sub-board 220 includes a CPU 221, a memory 223, a bus controller 224, a nonvolatile memory 225, an image processor 227, a device controller 228, and a device controller 229. As described above, the sub-board 220 is constituted by the relatively small general-purpose CPU system and the image processing hardware. The CPU 221 controls the overall board. The memory 223 is used as a work memory by the CPU 221. The bus controller 224 has a bride function for an external bus. The nonvolatile memory 225 is a memory which retains data even when the power source is interrupted. The image processor 227 and the device controllers 228 and 229 constitute a block for performing real-time digital image processing. The scanner apparatus 2 and the printer apparatus 4 exchange digital image data via the device controllers 228 and 229. The CPU 221 directly controls the FAX apparatus 7.

Figure 2:
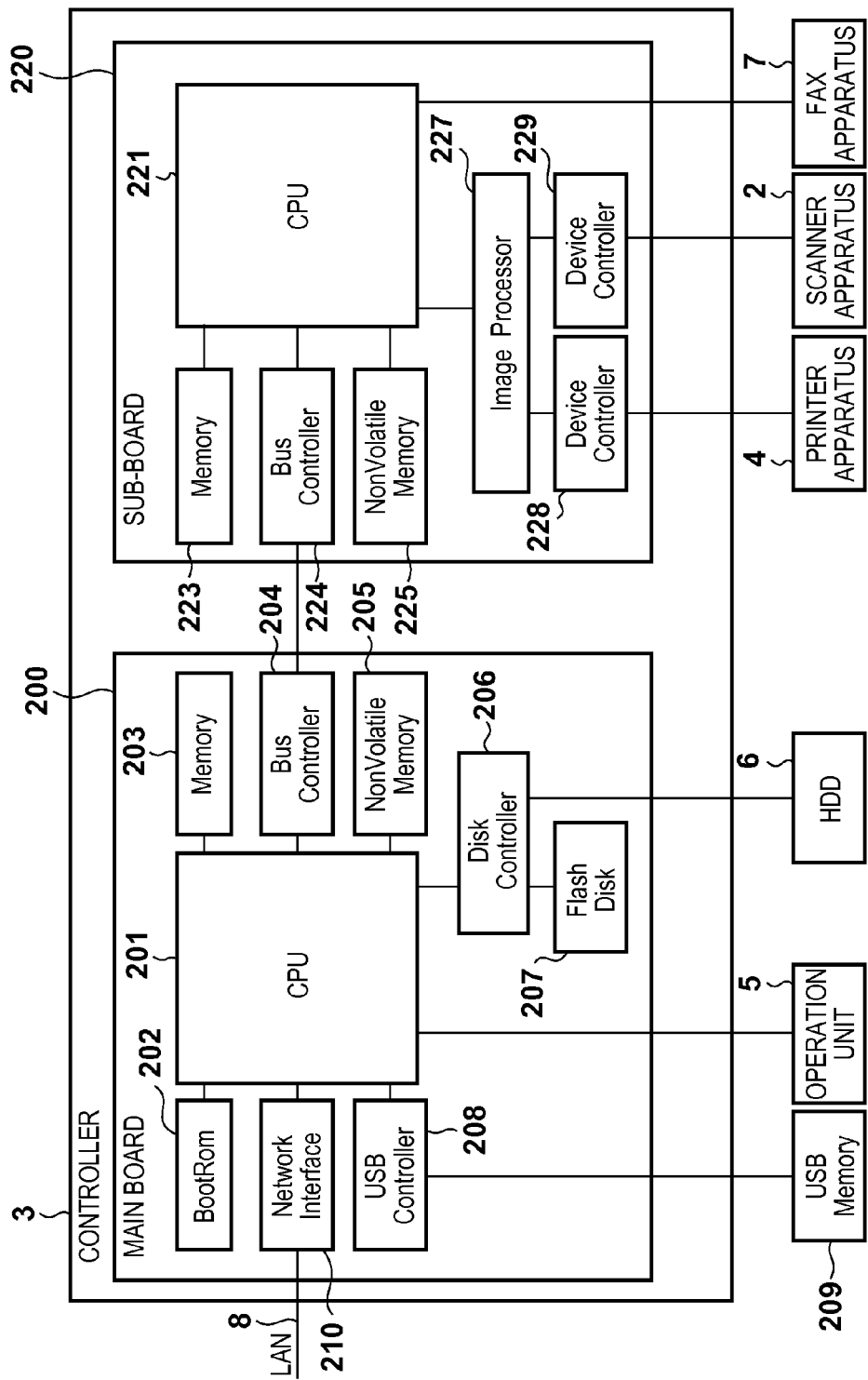
FIG. 2 is a block diagram showing the circuit arrangement of a controller according to the first embodiment.

Note that FIG. 2 is a block diagram simply showing the circuit arrangement. For example, the CPU 201, the CPU 221, and the like include many pieces of CPU peripheral hardware such as a chip set, bus bridge, and clock generator. For the sake of descriptive simplicity, an illustration of these will be omitted. That is, the present invention is not intended to be limited to the block arrangement shown in FIG. 2.

<Operation of Controller 3>

The operation of the controller 3 will be described by exemplifying an image copying operation using a paper medium. When the user issues an instruction to perform an image copying operation via the operation unit 5, the CPU 201 sends an image read instruction to the scanner apparatus 2 via the CPU 221. The scanner apparatus 2 optically scans a paper document, converts the scanned data into digital image data, and inputs the digital image data to the image processor 227 via the device controller 228. The image processor 227 temporarily saves the digital image data in the memory 223 by DMA transfer via the CPU 221.

Upon confirming that a predetermined amount or all of the digital image data are input to the memory 223, the CPU 201 outputs an image output instruction to the printer apparatus 4 via the CPU 221. The CPU 221 notifies the image processor 227 of the position of image data in the memory 223, and transmits the image data in the memory 223 to the printer apparatus 4 via the image processor 227 and the device controller 228 in accordance with a synchronization signal from the printer apparatus 4. With this operation, the printer apparatus 4 prints an image corresponding to the digital image data on a paper medium. When printing on a plurality of paper media, the CPU 201 can save, in the hard disk 6, the image in the memory 223, and send the image to the printer apparatus 4 without acquiring any images on the second and subsequent paper media from the scanner apparatus 2.

<Power Source Arrangement>

Figure 3:
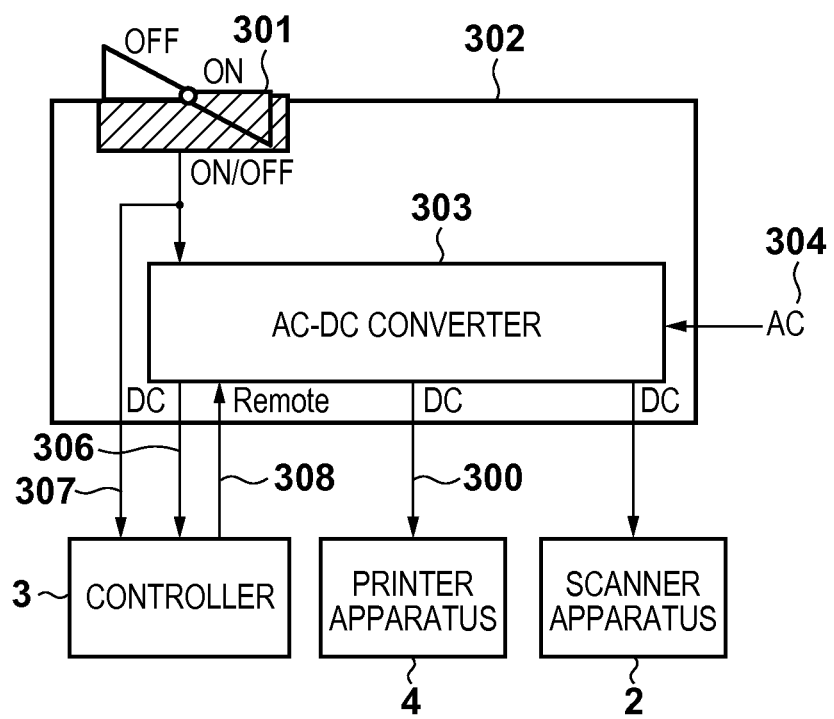
FIG. 3 is a block diagram showing an example of the power source arrangement of the image processing apparatus according to the first embodiment.

The arrangement of a power source and power switch (shutdown switch) in the image processing apparatus 1 will be described next with reference to FIG. 3. Reference numeral 301 denotes a toggle switch; 302, a power source unit; 303, an AC-DC converter; 304, an AC power source input unit; 305, a power source cable which supplies DC power to the printer apparatus 4; 306, a power source cable which supplies power to the controller 3; 307, a line which notifies the controller 3 of the state of the toggle switch 301; and 308, a power source remote signal which can control the output of the AC-DC converter.

The user can turn the apparatus on/off by operating the toggle switch 301. When in the ON state, this switch is connected to the AC-DC converter and can control the energization state of the power source. When in the OFF state, the switch should not stop power supply to the power source cable 306 until the controller 3 completes the shutdown of the system. That is, upon being notified of the state of the toggle switch 301 via the line 307, the controller 3 turns off the DC power supply cable 306 by using a power source remote signal on the line 307 after the completion of shutdown.

The above description is about the power source arrangement of a general device requiring shutdown. The toggle switch 301 is a switch which mechanically holds either an ON state or an OFF state. The user can input a state by tilting the switch to the ON or OFF side. This embodiment uses the toggle switch which explicitly indicates its OFF/ON state. However, many personal computers and the like use power switches having no state (including power switches which function themselves as power saving state shift switches and the like). Such a switch having no state functions to issue an "OFF/power saving state shift instruction" when the power source of the apparatus is turned on, and functions to issue an "ON instruction" when the power source of the apparatus is turned off. This system has a control pattern such as keeping the switch for a predetermined period of time or more will input a "forced OFF instruction". The present invention is not limited to the toggle switch. When using a switch having no state, the present invention may set the ON/OFF pattern of the power source of the apparatus in correspondence with the ON/OFF pattern of the toggle switch.

Figure 6:
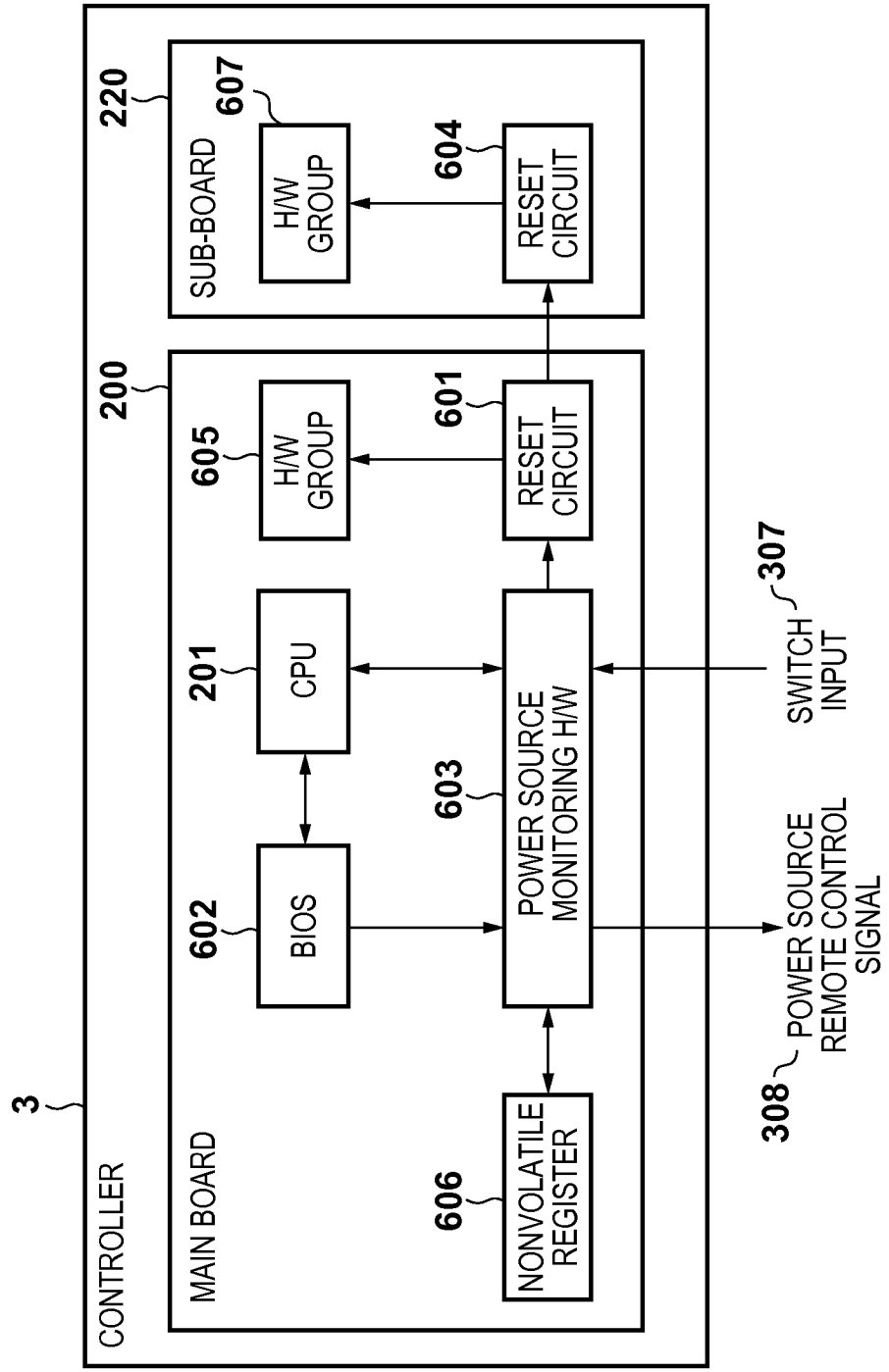
FIG. 6 is a block diagram showing an example of power source monitoring H/W in the first embodiment.

FIG. 6 is a block diagram which focuses on a portion around the power source control/reset circuit of the controller 3 in this embodiment. Reference numeral 601 denotes a reset circuit on the main board 200; 602, a BIOS which controls the basic portion of the H/W (load) on the main board 200; and 603, a dedicated H/W logic which monitors the power source control of the image processing apparatus 1. In the case of ASIC, this H/W logic may be a small CPU system or the like.

Reference numeral 604 denotes a reset circuit on the sub-board 220; 605, an H/W group (loads) on the main board 200; 607, an H/W group 607 on the sub-board 220; and 606, a nonvolatile register whose state is not reset by H/W reset operation or the like.

Synchronous H/W is designed to reset its internal state by resetting operation. For this reason, when implementing an H/W circuit using synchronous H/W, it is necessary for a reset circuit to reset each piece of H/W upon supplying power to each chip after the power source is turned on. Since a plurality of H/W chips have a subordinate-superior relationship, a reset sequence is designed to sequentially reset them. For this reason, in general, as in this embodiment, one board has one reset circuit, and each reset circuit performs resetting operation in a corresponding board.

The system of the main board 200 is the main board of the image processing apparatus 1, in particular, and has the power source monitoring H/W 603. This board receives the state of the power switch through the line 307. Using the power source remote signal 308 allows to control power supply on the main board 200. When the CPU 201 can properly operate, it is possible to reset the system in accordance with an instruction from the CPU 201. While no power is supplied to the CPU 201, it is possible to turn on the power source of the controller 3 by controlling the power source remote signal 308 as an input to the power switch through the line 307.

The nonvolatile register 606 can read and write information from and in the CPU 201. The BIOS 602 includes a low-level H/W control library. In general, the BIOS serves to ensure compatibility with IBM compatible machines, and is not indispensable to a so-called computer system, but can implement part of a power saving function based on, for example, the ACPI specification. The controller 3 in this embodiment has the ACPI-S3 (memory resume) function generally used as a power saving technique in a personal computer or the like. The BIOS 602 is described only for part of the function.

In the image processing apparatus 1 having the above H/W arrangement, when, for example, the user turns off the toggle switch 301, the CPU 201 can receive the state of the power switch via the line 307 and the power source monitoring H/W 603. That is, when detecting power OFF, the CPU 201 activates a shutdown sequence to issue a shutdown instruction to the power source monitoring H/W 603. As a consequence, the CPU 201 notifies the AC-DC converter 303 of power OFF via the power source remote signal 308 to turn off the power source cable 306 of the controller 3, thereby completely shutting down the system.

The image processing apparatus 1 in this embodiment can be shut down remotely from the computer 9 via the LAN 8. The CPU 201 detects the reception of a shutdown instruction via the network interface 210, and issues a shutdown instruction to the power source monitoring H/W 603, thereby shutting down this system. The CPU 201 uses a communication protocol called UDP (User Datagram Protocol) to issue a shutdown instruction via the LAN 8. When a predetermined data string is stored in the payload portion of a UDP packet, the packet is regarded as a shutdown instruction. These types of shutdown completely terminate a program on the CPU 201. When, therefore, the power switch 301 is turned on next, the program on the CPU 201 starts up in an ordinary manner.

<ACPI-S3 Suspend Scheme>

The operation of the ACPI-S3 suspend scheme in this embodiment will be described next. The CPU 201 calls, for example, the power saving I/F of the OS to finally make a transition to the ACPI-S3 power saving state as a function which the BIOS 602 and the power source monitoring H/W 603 have. The CPU 201 can make the power source unit 302 transit to the ACPI-S3 power saving state via the power source remote signal 308. In the ACPI-S3 power saving state, only the memory 203 and part of the H/W (loads) are energized.

At this time, the system is not in the power OFF state but is in a "suspend state" in which the memory retains the program state, and hence can resume the execution of the program within a short period of time upon releasing of the suspend state due to a predetermined external factor. The image processing apparatus 1 of the present invention has a function of standing by while keeping energizing part of the hardware such as the memory while the power switch 301 is OFF, in order to reduce the time until a copying operation or the like can be actually performed after the user has turned on the power switch 301. In order to discriminate the above states in the following description, the state in which the normal power source is OFF will be referred to as a "power OFF state (first state)", and the state in which the system is standing by owing to the above function will be referred to as a "quick OFF state (second state)".

The image processing apparatus 1 according to this embodiment is configured to allow the user to select shifting the apparatus to the power OFF state or the quick OFF state by setting a validity flag (first flag) when he/she performs shutdown operation. This setting is implemented by making the CPU 201 function as the first setting unit and set the setting in advance based on a user input and the like. The user can make setting in advance as to whether to activate the quick OFF state, by performing a predetermined operation via the operation unit 5. If a validity setting has not been made for the quick OFF state, the image processing apparatus 1 always shifts to the power OFF state.

<Shutdown Operation>

The shutdown operation of the image processing apparatus 1 according to this embodiment will be described next with reference to FIG. 4. Note that the CPU 201 on the main board 200 implements the processing to be described below by reading out and executing a control program stored in the memory 203. The flowchart of FIG. 4 corresponds to operation to be performed when the user shuts down the image processing apparatus 1. That is, the CPU 201 executes this procedure upon detecting that the power switch 301 is turned off or a shutdown instruction is received via the network interface 210. Assume that the user has made setting in advance via the operation unit 5 as to whether to make a shift to the quick OFF state or the power OFF state after the sequence.

First of all, in step S401, when starting shutdown operation, the CPU 201 on the main board 200 displays a window corresponding to a shutdown period on the operation unit 5. In step S402, the CPU 201 then performs interruption/termination processing of services and the like which are currently provided. The termination processing is concurrently executed in a plurality of processes, and hence the CPU 201 waits for the completion of the termination in step S403. If the CPU 201 determines in step S403 that all the termination processing is complete, the process advances to step S404.

In step S404, the CPU 201 synchronizes the value of the memory with a storage. This operation corresponds to, for example, the processing of synchronizing the storage buffer cached in the memory with the storage. In step S405, the CPU 201 determines whether to make a shift to the power OFF state or the quick OFF state. If the CPU 201 determines to make a shift to the power OFF state, the process advances to step S407 upon skipping the operation in step S406. If the CPU 201 determines to make a shift to the quick OFF state, the process advances to step S406.

Figure 7:
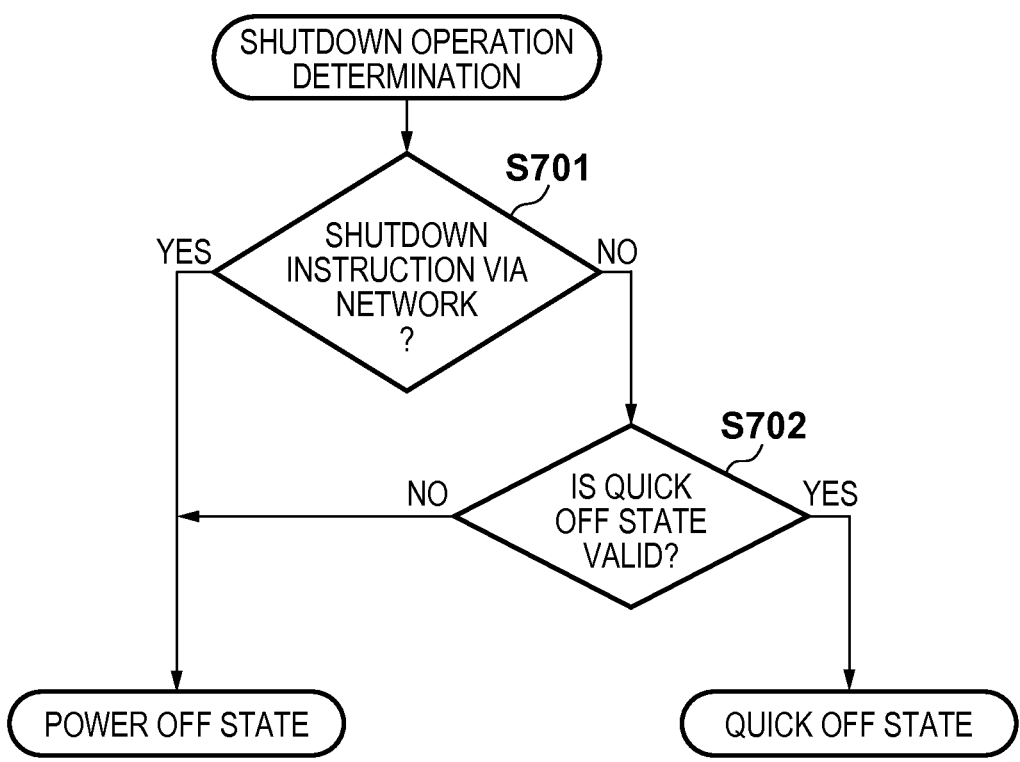
FIG. 7 is a flowchart showing a processing procedure for deciding a shift destination state at the time of shutdown according to the first embodiment.

The determination processing in step S405 will be described in detail below with reference to FIG. 7. In step S701, the CPU 201 determines whether a trigger for the start of shutdown operation is the reception of a shutdown instruction via the LAN 8. If YES in step S701, the CPU 201 determines to make a shift to the power OFF state. If NO in step S701, that is, if the shutdown operation is based on the turning off of the power switch 301, the CPU 201 determines in step S702 whether the quick OFF state has been a validity setting (first flag). If the setting is valid, the CPU 201 determines to make a shift to the quick OFF state. If the setting is not valid, the CPU 201 determines to make a shift to the power OFF state.

Referring back to FIG. 4, in step S406, the CPU 201 sets a startup preparation reboot flag to make a shift to the quick OFF state. The process then advances to step S407. More specifically, the CPU 201 sets the startup preparation reboot flag in the nonvolatile register 606. The contents held in the nonvolatile register 606 are not reset even when the controller 3 is reset. The startup preparation reboot flag is a flag for permitting the execution of reboot processing as the next startup preparation at the time of shutdown to reduce the startup time to start up the image processing apparatus 1 again after shutdown.

In step S407, the CPU 201 calls the shutdown I/F of the OS and performs software final termination processing of the OS. Thereafter, in step S408, the CPU 201 switches the processing depending on whether to make a shift to the power OFF state, based on the determination in step S405. When shifting to the quick OFF state (second state), the process advances to step S409. When shifting to the power OFF state (first state), the process advances to step S410.

In step S409, the CPU 201 issues a system reboot request to the power source monitoring H/W 603. The power source monitoring H/W 603 issues a system overall reset instruction to the reset circuit 601. The reset circuit 601 notifies the reset circuit 604 on the sub-board 220 of the corresponding information, thus issuing a reset request for the overall board. Since this reset request is a reboot request, a reset request is also issued to the CPU 201. The CPU 201 then performs, for example, boot processing from the BIOS 602 by issuing a reset exception. That is, when shifting to the quick OFF state, the CPU 201 performs reboot processing without turning off the power source regardless of whether a shutdown instruction is issued. The shutdown sequence is therefore connected to the boot sequence in FIG. 5. On the other hand, in step S410, the CPU 201 issues a shutdown instruction to the power source monitoring H/W 603. The CPU 201 notifies the AC-DC converter 303 of a power OFF instruction via the remote signal 308. Turning off the power source cable 306 of the controller 3 will turn off the power source of the image processing apparatus 1.

<Boot Operation>

The boot sequence for the image processing apparatus 1 in this embodiment will be described next with reference to FIG. 5. The system starts up the boot method in a multi-stage manner. Since this part is difficult to explain, the concept of the processing performed by the CPU 201 will be described with reference to a flowchart. Note that the CPU 201 on the main board 200 implements the processing to be described below by reading out and executing a control program stored in the memory 203. The CPU 201 starts executing the sequence in FIG. 5 when the user turns on the power switch 301 in the power OFF state or the reset circuit 601 described above resets the overall system.

In step S501, when starting operation, the CPU 201 initializes the H/W. When initializing the H/W, the CPU 201, for example, initializes the register and interruption and registers a device driver corresponding to a kernel startup unit. Subsequently, in step S502, the CPU 201 determines in step S406 in FIG. 4 whether a startup preparation reboot flag is set. When this flag is set, the process skips step S503 and advances to step S504. When the flag is not set, the process advances to step S503, in which the CPU 201 performs initialization and display on the operation unit 5, and the process advances to step S504. For example, since this is the first display operation, the CPU 201 displays information indicating "startup in progress". That is, when the startup preparation flag is set, the CPU 201 continues initialization while display no specific information on the operation unit 5.

In step S504, the CPU 201 initializes the software layer. More specifically, the CPU 201 calls the initialization routine of each library, and starts up the first process thread group in step S505. In this case, it is appropriate to initialize mainly pure software services and the like which have no influence on peripheral H/W. The reason will be described later.

In step S506, the CPU 201 refers to the startup preparation reboot flag to which the CPU 201 has also referred in step S502. If this flag is not set, since normal startup processing is to be performed, the process advances to step S512. If the flag is set, since this boot processing is startup operation for startup preparation, the process advances to step S507, in which the CPU 201 waits until the completion of the processing in step S505. When performing this sequence while the startup preparation reboot flag is set, the CPU 201 performs no display on the operation unit 5, and clears the startup preparation reboot flag in step S508, even during startup operation. Subsequently, in step S509, the CPU 201 shifts to the ACPI-S3 suspend mode. Since the method for entering ACPI-S3 in this H/W has been described above, a description of the method will be omitted hereinafter.

In this state, the startup processing temporarily stops, and the image processing apparatus 1 is set in the quick OFF state. At this time, only the memory 203 and the power source monitoring H/W 603 on the main board 200 are energized, and they consume only several W of power. In the quick OFF state, neither the printer apparatus 4 and the scanner apparatus 2 nor the FAX apparatus 7 and the network interface 210 are energized. In this manner, when performing shutdown operation, the CPU 201 performs reboot operation without turning off the power source after the shutdown operation, and enters a power saving state during startup operation without displaying on the operation display unit at the time of the next startup operation. This is one sequence characteristic to the present invention. The user feels as if the shutdown state were continuing for a longer period of time than normal instead of execution of reboot operation. This makes it possible to reduce a feeling of strangeness.

When using the main body in the quick OFF state, the user turns on the power switch 301. The power source monitoring H/W 603 then detects power ON operation via the line 307, and notifies the power source unit 302 of information indicating that "the overall apparatus is turned on by turning on the switch" via the power source remote signal 308. When the power source is turned on, the power source unit 302 supplies corresponding power to the overall system. More specifically, the power source unit 302 energizes the controller 3, the printer apparatus 4, and the scanner apparatus 2 via the respective power supply routes.

In step S510, when the power switch 301 is turned on, the CPU 201 determines whether to release ACPI-S3. When releasing ACPI-S3, the CPU 201 resumes the execution of the program stored in the memory from the state immediately before the shift to ACPI-S3. The process then advances to step S511. In step S511, the CPU 201 performs initialization and display on the operation unit 5. The process advances to step S512. This changes the display on the operation unit 5 to "startup in progress".

In step S512, the CPU 201 starts up the second process thread group. The CPU 201 starts up only those of these programs which have not been started up before the ACPI-S3 suspend state in step S505 to perform communication for startup operation with mainly peripheral apparatuses such as the printer apparatus 4 and the scanner apparatus 2. Subsequently, in step S513, the CPU 201 performs negotiation with the printer apparatus 4 and the scanner apparatus 2 to establish communication. The process then shifts to the idle state in step S514.

Figure 5:
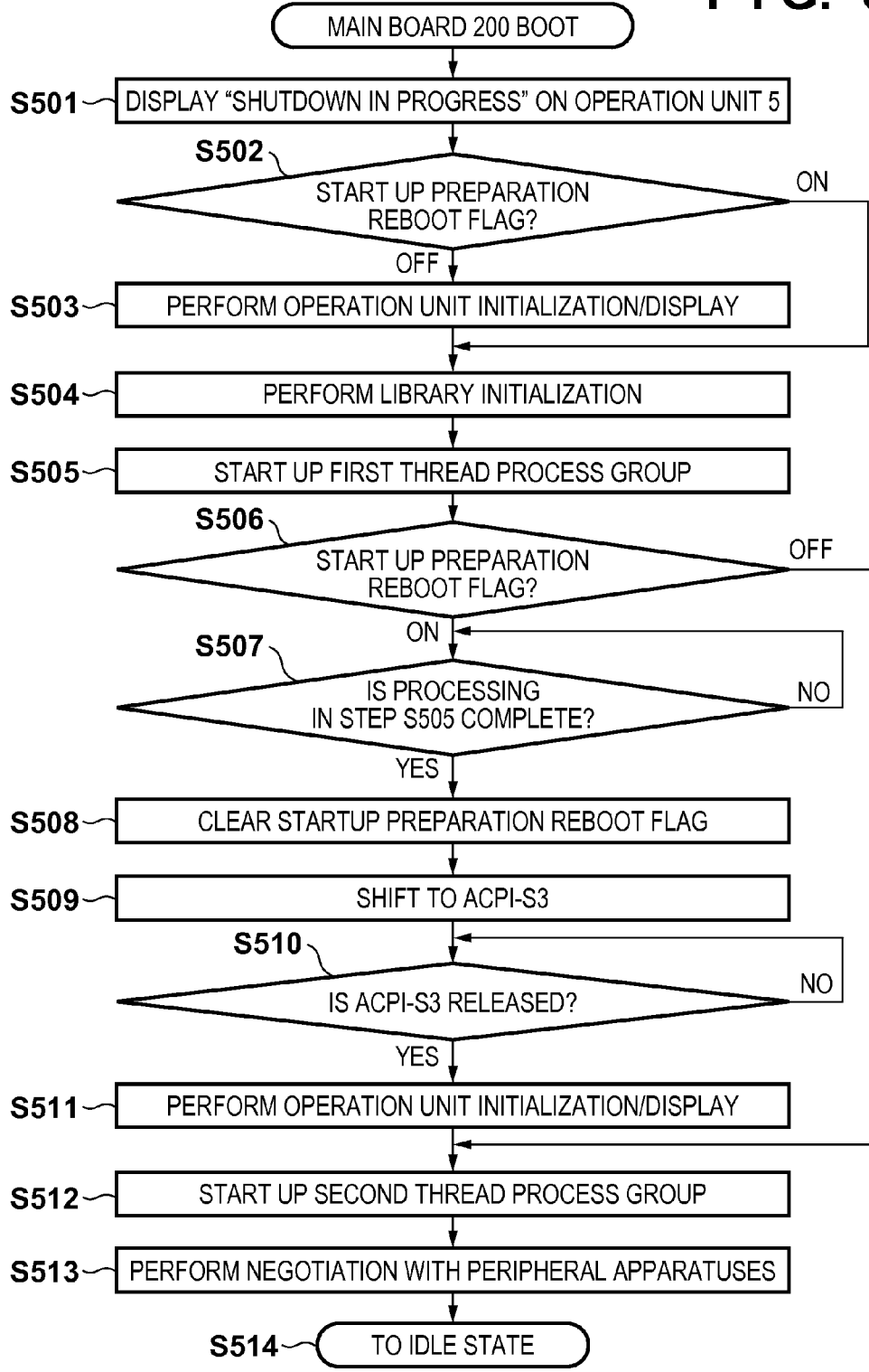
FIG. 5 is a flowchart showing a processing procedure at the time of startup in the image processing apparatus according to the first embodiment.

As compared with the case in which the user turns on the power switch 301 in the power OFF state, turning on the power switch 301 in the quick OFF state can eliminate the wait time corresponding to the processing in steps S501 to S505 in FIG. 5. This makes it possible to greatly reduce the wait time until copying operation or the like can be actually performed after the user has turned on the power switch 301.

As described above, the image processing apparatus described in this embodiment can guarantee that it shifts to a safe state even at the time of a power failure by performing control to always make a shift to the power OFF state upon reception of a shutdown instruction via the network. On the other hand, when the user performs shutdown operation by operating the power switch of the main body, the apparatus shifts to the quick OFF state. This can reduce the time until the user can actually use the image processing apparatus after he/she has next turned on the switch. In this manner, the image processing apparatus according to this embodiment switches between shifting to the power OFF state and shifting to the quick OFF state depending on whether the user has directly operated the power switch or the apparatus has received a shutdown instruction via the network. Note that when issuing a shutdown instruction via the LAN 8, the embodiment uses a UDP packet. However, this arrangement is a merely an example, and the present invention is not limited to it. For example, the apparatus may use TCP (Transmission Control Protocol) for communication with the computer 9. For example, the present invention can be applied to even an arrangement using SOAP for issuing a shutdown instruction.

<Second Embodiment>

Figure 8:
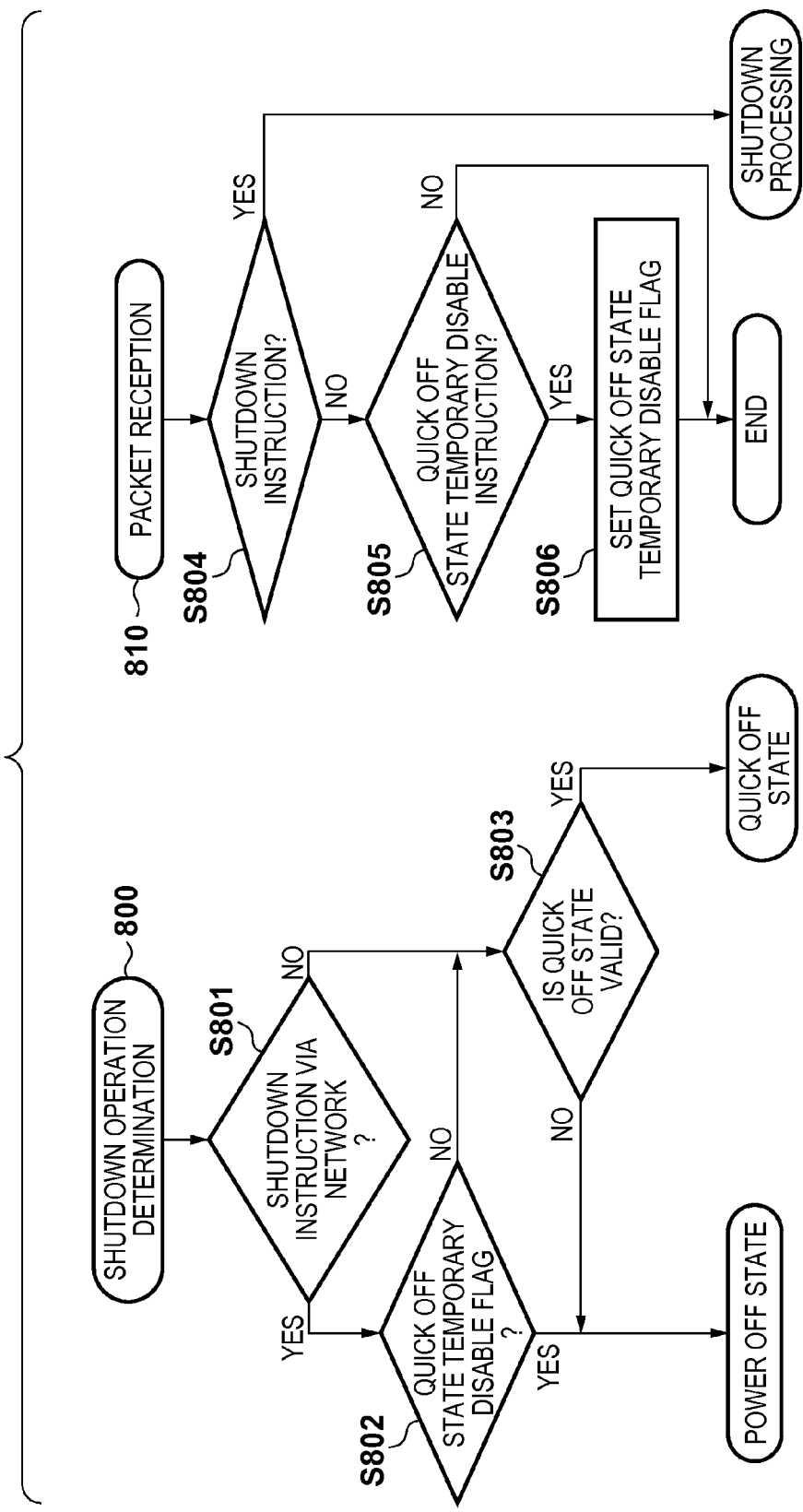
FIG. 8 is a flowchart showing a processing procedure for deciding a shift destination state at the time of shutdown according to the second embodiment.

The second embodiment will be described next with reference to FIG. 8. The first embodiment is configured to always set the power OFF state when a shutdown instruction is issued via the network. Depending on the installation environment, there is a need to selectively use the power OFF state and the quick OFF state. This embodiment will therefore exemplify an arrangement configured to accept, via the network, an instruction to temporarily disable the validity setting for the quick OFF state. Only arrangements and techniques different from those in the above embodiment will be described, and a description of the same arrangements and techniques will be omitted. In this embodiment, an image processing apparatus 1 is configured to accept a disable instruction to temporarily disable the quick OFF state in addition to a shutdown instruction described in the first embodiment. The data strings of the payload portions of UDP packets serve to discriminate between a shutdown instruction and a disable instruction.

A flowchart 810 of FIG. 8 will be described first. The flowchart 810 shows an operation procedure to be performed by a CPU 201 upon receiving these instructions via the network interface 210. In step S804, the CPU 201 determines whether the received instruction is a shutdown instruction. If the received instruction is a shutdown instruction, the CPU 201 starts shutdown operation for the image processing apparatus 1. If the received instruction is not a shutdown instruction, the process advances to step S805, in which the CPU 201 determines whether the received instruction is the above disable instruction. If the received instruction is a disable instruction, the process advances to step S806, in which the CPU 201 sets a disable flag (second flag) to temporarily disable the quick OFF state. If the received instruction is not a disable instruction, the CPU 201 terminates the processing without performing any operation.

Shift destination state determination processing performed by the CPU 201 in shutdown processing will be described next with reference to a flowchart 800 of FIG. 8. In step S801, the CPU 201 determines whether it has accepted a shutdown instruction via the network. If YES in step S801, the process advances to step S802. If NO in step S801, the process advances to step S803. In step S802, the CPU 201 determines whether a temporary disable flag for the quick OFF state is set. If YES in step S802, the CPU 201 determines to make a shift to the power OFF state. If NO in step S802, the process advances to step S803. In step S803, the CPU 201 determines whether validity setting has been made for the quick OFF state. If such setting has been made, the CPU 201 determines to make a shift to the quick OFF state. If such setting has not been made, the CPU 201 determines to make a shift to the power OFF state.

As described above, the image processing apparatus described in this embodiment can set a disable instruction to temporarily disable the quick OFF state via the network. This image processing apparatus therefore shifts to the power OFF state when a shutdown instruction is received via the network and a disable instruction is set. Assume that a shutdown instruction is received via the network. Even in this case, if no disable instruction is set, the CPU determines whether to completely set the image processing apparatus in the power OFF state, in accordance with the status of validity setting for the quick OFF state.

<Third Embodiment>

Figure 9:
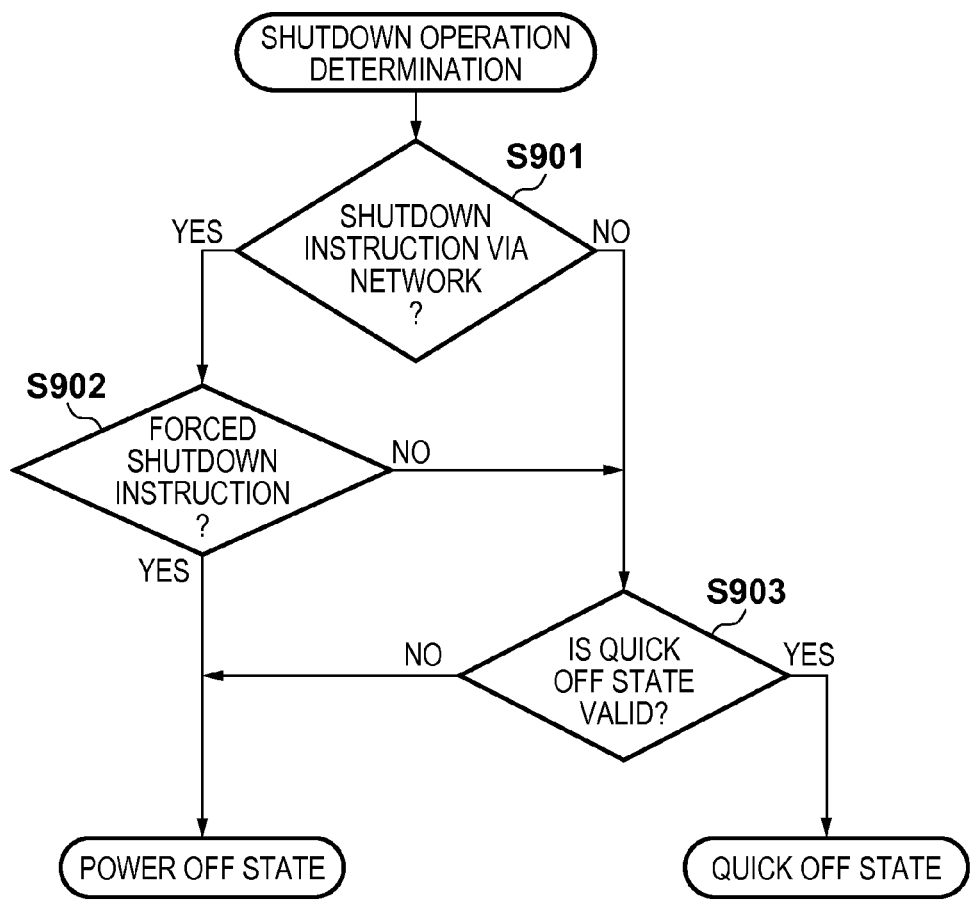
FIG. 9 is a flowchart showing a processing procedure for deciding a shift destination state at the time of shutdown according to the third embodiment.

The third embodiment will be described next with reference to FIG. 9. The second embodiment described above is configured to make a shift to the power OFF state upon receiving a temporary disable instruction for the quick OFF state before the reception of a shutdown instruction to selectively use the power OFF state and the quick OFF state. It is however possible to selectively use the power OFF state and the quick OFF state in accordance with one instruction instead of using two instructions, namely a temporary disable instruction for the quick OFF state and a shutdown instruction. The third embodiment therefore provides two types of shutdown instructions, namely a normal shutdown instruction to make a shift to the quick OFF state and a forced shutdown instruction to forcibly make a shift to the power OFF state, and selectively uses the power OFF state and the quick OFF state in accordance with one of the instructions. In this embodiment, an image processing apparatus 1 is configured to accept two types of instructions, namely a normal shutdown instruction and a forced shutdown instruction, as an instruction received via a LAN 8. The data strings of the payload portions of UDP packets serve to discriminate between a normal shutdown instruction and a forced shutdown instruction. Upon receiving one of the two types of instructions, a CPU 201 regards the received instruction as a shutdown instruction via the network, and starts shutdown processing. FIG. 9 shows shift destination state determination processing performed by the CPU 201 in shutdown processing.

In step S901, the CPU 201 determines whether the received instruction is a shutdown instruction via the network. If YES in step S901, the process advances to step S902. If NO in step S901, the process advances to step S903. Upon determining in step S902 that the instruction received via the network is a forced shutdown instruction, the CPU 201 determines to make a shift to the power OFF state. If the received instruction is not a forced shutdown instruction, that is, if the received instruction is a normal shutdown instruction, the process advances to step S903, in which the CPU 201 determines whether a validity setting has been made for the quick OFF state. If YES in step S903, the CPU 201 determines to make a shift to the quick OFF state. If NO in step S903, the CPU 201 determines to make a shift to the power OFF state.

As described above, it is possible to set the image processing apparatus of this embodiment in the power OFF state by one instruction by using a forced shutdown instruction as a shutdown instruction received via the network. In addition, using a normal shutdown instruction can set the image processing apparatus in the partially energized state or the power OFF state by using one instruction in accordance with the settings made in the apparatus.

<Fourth Embodiment>

Figure 10:
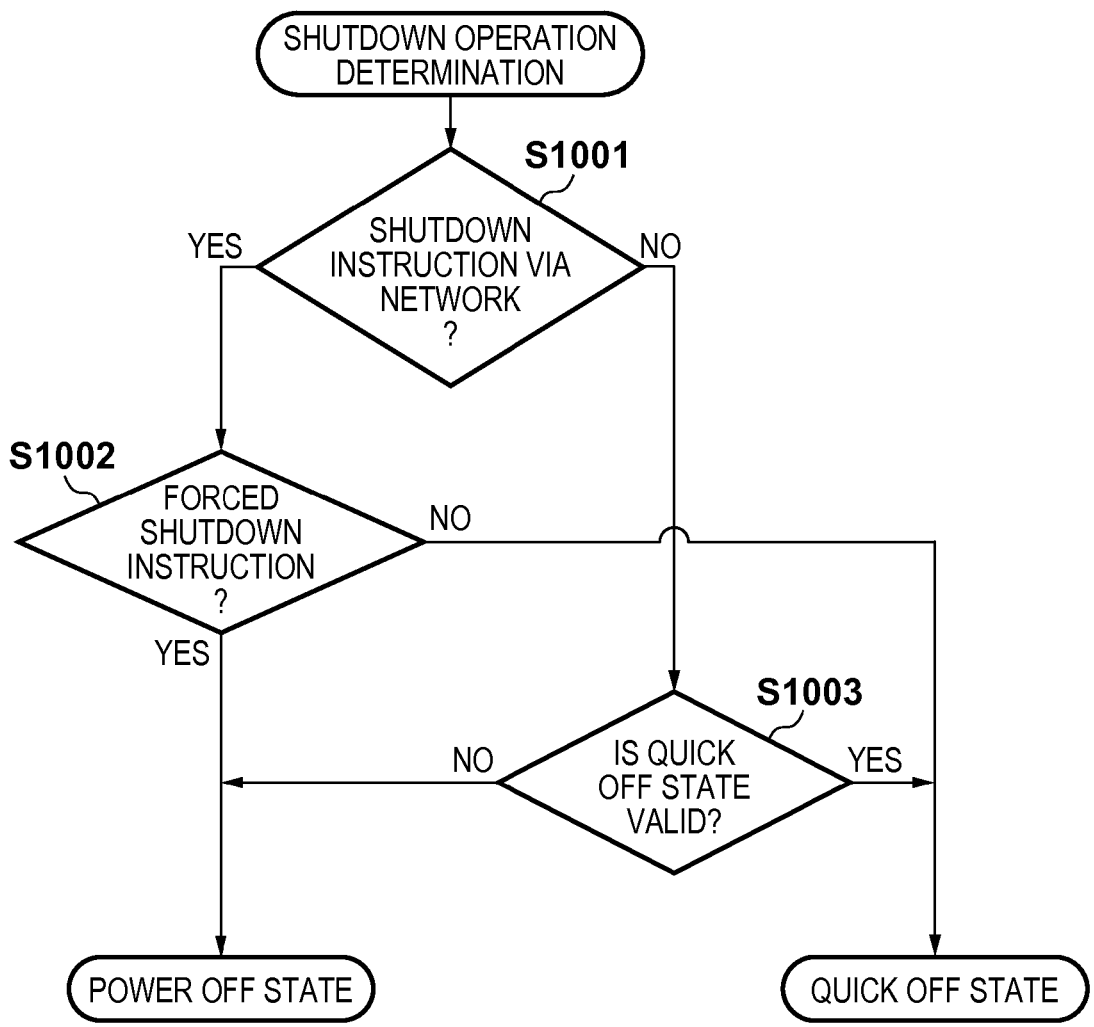
FIG. 10 is a flowchart showing a processing procedure for deciding a shift destination state at the time of shutdown according to the fourth embodiment.

The fourth embodiment will be described next with reference to FIG. 10. The third embodiment is configured to provide two types of instructions, namely a normal shutdown instruction and a forced shutdown instruction to selectively use the power OFF state and the quick OFF state by one instruction and perform operation in response to a normal shutdown instruction in accordance with settings in the image processing apparatus. However, the image processing apparatus may be configured to always shift to either the power OFF state or the quick OFF state, which is explicitly instructed, against the settings in the apparatus, if an instruction is received via the network. Unlike the third embodiment described above, the fourth embodiment is configured to always make a shift to the quick OFF state when receiving a normal shutdown instruction. FIG. 10 shows shift destination state determination processing performed by the CPU 201 in shutdown processing.

In step S1001, a CPU 201 determines whether the received instruction is a shutdown instruction via the network. If YES in step S1001, the process advances to step S1002. If NO in step S1001, the process advances to step S1003. Upon determining in step S1002 that the instruction received via the network is a forced shutdown instruction, the CPU 201 determines to make a shift to the power OFF state. If NO in step S1002, that is, the received instruction is a normal shutdown instruction, the CPU 201 determines to make a shift to the quick OFF state. In step S1003, the CPU 201 determines whether validity setting has been made for the quick OFF state. If such setting has been made, the CPU 201 determines to make a shift to the quick OFF state. If such setting has not been made, the CPU 201 determines to make a shift to the power OFF state.

As described above, according to the image processing apparatus of this embodiment, using a forced shutdown instruction can shift the apparatus to the power OFF state by one instruction. In addition, using a normal shutdown instruction can shift the image processing apparatus to the quick OFF state, which is a partially energized state, by one instruction.

<Fifth Embodiment>

Figure 11A:
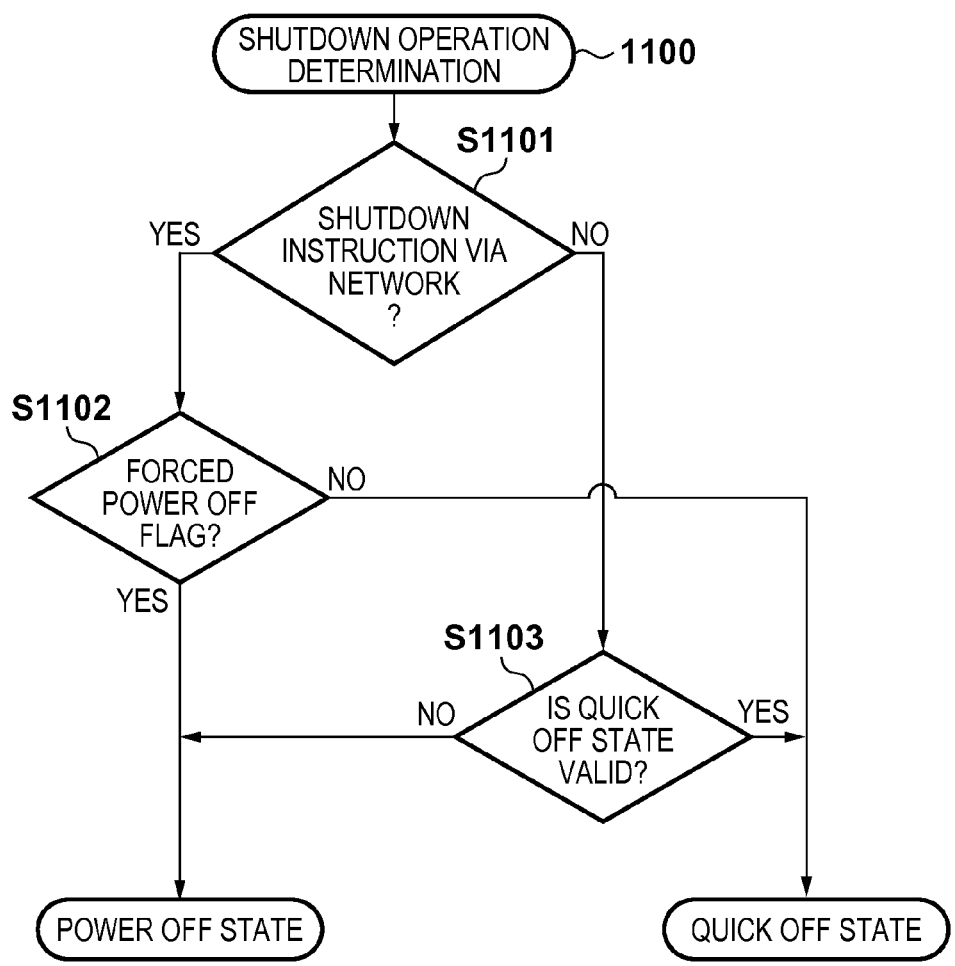
FIGS. 11A and 11B are flowcharts showing a processing procedure for deciding a shift destination state at the time of shutdown according to the fifth embodiment.
Figure 11B:
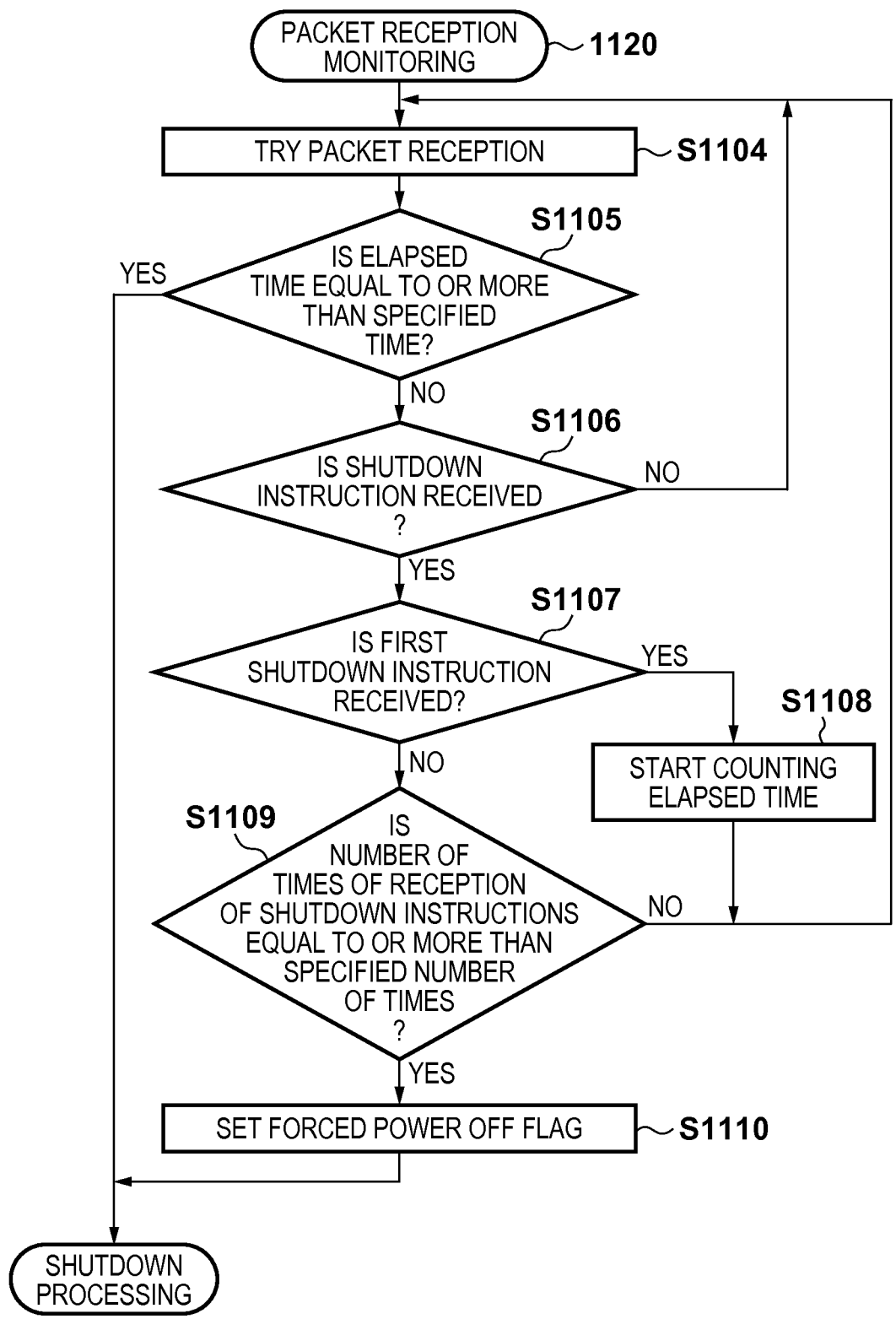

The fifth embodiment will be described next with reference to FIGS. 11A and 11B. The second to fourth embodiments are configured to receive at least two types of instructions via the network so as to selectively use the power OFF state and the quick OFF state. Some installation environment may be a mixed environment in which there is also an image processing apparatus having only a function of shifting to the power OFF state in response to a shutdown instruction, without having any function of shifting to the quick OFF state. Such an image processing apparatus which does not have any function of shifting to the quick OFF state can accept only one type of shutdown instruction. In such a mixed environment, it is necessary for the arrangements according to the second to fourth embodiments to cope with both an image processing apparatus having a function of shifting to the quick OFF state and an image processing apparatus having no such function. However, it is also possible to selectively use the power OFF state and quick OFF state of an image processing apparatus having a function of shifting to the quick OFF state by using a computer corresponding to only an image processing apparatus having no function of shifting to the quick OFF state. This embodiment will therefore exemplify an arrangement configured to selectively use the power OFF state and the quick OFF state by using only one type of shutdown instruction. An image processing apparatus 1 according to this embodiment is configured to shift to the power OFF state upon receiving a predetermined number or more of shutdown instructions in a predetermined period of time via a LAN 8 and to make a shift to the quick OFF state in other cases.

Operation to be performed when a CPU 201 monitors the packet received via a network interface 210 will be described first with reference to a flowchart 1120 of FIG. 11B. In step S1104, the CPU 201 checks whether any UDP packet has arrived at the network interface 210. If YES in step S1104, the CPU 201 performs reception processing. Subsequently, in step S1105, the CPU 201 determines whether the elapsed time since the reception of the first shutdown instruction has exceeded a predetermined time. If the elapsed time is being counted from the reception of the first shutdown instruction and has exceeded the predetermined time, the CPU 201 starts shutdown processing. Otherwise, the process advances to step S1106.

In step S1106, the CPU 201 determines whether it has received a shutdown instruction via the network interface 210. If NO in step S1106, the process returns to step S1104 to repeat the above processing. If YES in step S1106, the process advances to step S1107. In step S1107, the CPU 201 determines whether the received instruction is the first shutdown instruction. If the received instruction is the first shutdown instruction, the process advances to step S1108 to start counting the elapsed time since the reception of the first shutdown instruction. The process then returns to step S1104. If the received instruction is not the first shutdown instruction, the process advances to step S1109.

In step S1109, the CPU 201 determines whether the number of times of reception of shutdown instructions has reached a predetermined number of times. If YES in step S1109, the process returns to step S1104. If the CPU 201 has received the predetermined number of shutdown instructions, the process advances to step S1110, in which the CPU 201 functions as the third setting unit to set a forced power OFF flag (third flag) and start shutdown processing.

Shift destination state determination processing performed by the CPU 201 in shutdown processing will be described next with reference to a flowchart 1100 of FIG. 11A. In step S1101, the CPU 201 determines whether the received instruction is a shutdown instruction via the network. If YES in step S1101, the process advances to step S1102. If NO in step S1101, the process advances to step S1103. In step S1102, if a forced power OFF flag is set, the CPU 201 determines to make a shift to the power OFF state. Otherwise, the CPU 201 determines to make a shift to the quick OFF state. In step S1103, the CPU 201 determines whether validity setting has been made for the quick OFF state. If such setting has been made, the CPU 201 determines to make a shift to the quick OFF state. If such setting has not been made, the CPU 201 determines to make a shift to the power OFF state.

In the above arrangement, when setting all the image processing apparatuses in the power OFF state, a computer 9 transmits at least a specified number of shutdown instructions to all the image processing apparatuses. If an image processing apparatus has a function of shifting to the quick OFF state, the apparatus shifts to the power OFF state upon receiving the last one of the specified number of shutdown instructions. If an image processing apparatus has no function of shifting to the quick OFF state, the apparatus shifts to the power OFF state upon receiving the first shutdown instruction. When shifting to the quick OFF state, if possible, the computer 9 transmits shutdown instructions to all the image processing apparatuses once.

As described above, according to the image processing apparatus described in this embodiment, it is possible to selectively use the power OFF state and quick OFF state of the image processing apparatus having a function of shifting to the quick OFF state by using only one type of shutdown instruction. It is also possible to shift all the image processing apparatuses in a mixed environment to the power OFF state by using a computer corresponding to only an image processing apparatus having no function of shifting to the quick OFF state.

<Sixth Embodiment>

The sixth embodiment will be described next with reference to FIG. 12. According to the embodiments described above, the user who operates the computer 9 selects at the time of transmission of a shutdown instruction whether to always shift the image processing apparatus 1 to the power OFF state. In contrast to this, the sixth embodiment is configured to determine on the image processing apparatus 1 side, based on predetermined conditions, whether to make a shift to the power OFF state. If, for example, the administrator of the image processing apparatus 1 owns the computer 9 which has transmitted a shutdown instruction, the image processing apparatus 1 may be made to shift to the power OFF state. This embodiment will therefore exemplify an image processing apparatus 1 configured to shift to the power OFF state upon receiving a shutdown instruction from a predetermined transmission source. The image processing apparatus 1 of this embodiment is configured to register a transmission source IP address as a setting for shifting the apparatus to the power OFF state in accordance with a shutdown instruction. The user registers a target IP address in advance by performing predetermined operation with an operation unit 5. Note that the user may register one or a plurality of IP addresses.

Figure 12:
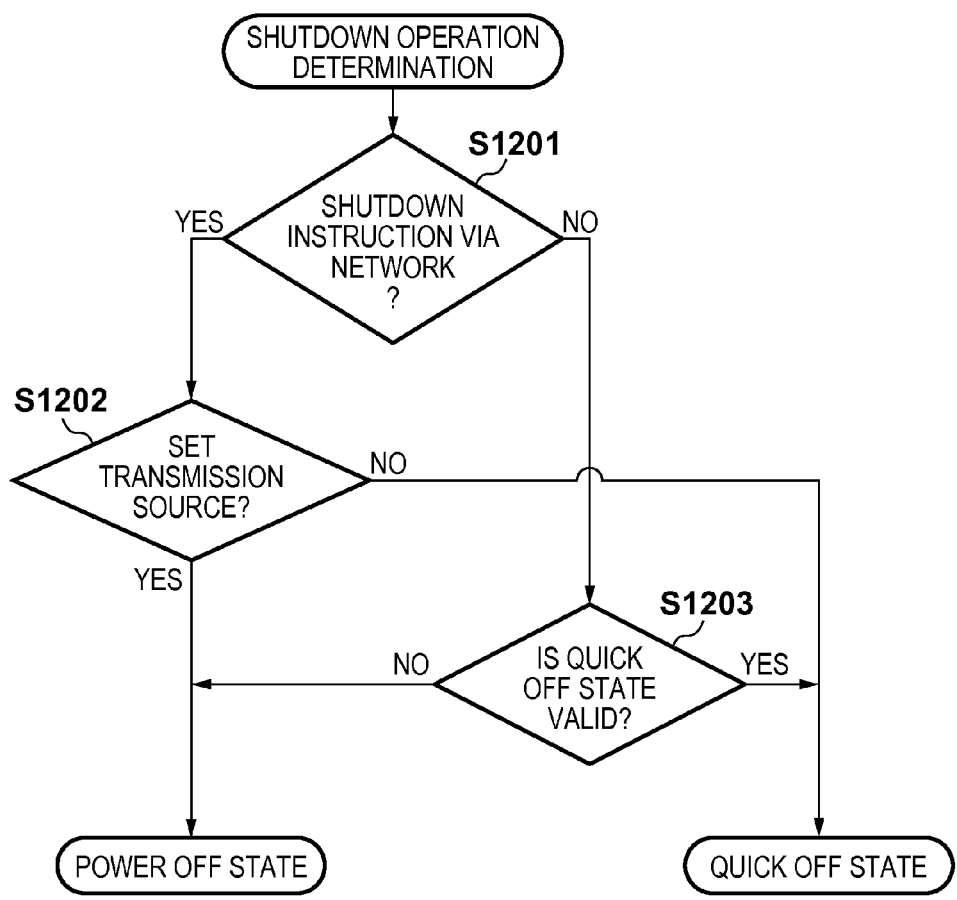
FIG. 12 is a flowchart showing a processing procedure for deciding a shift destination state at the time of shutdown according to the sixth embodiment.

FIG. 12 shows shift destination state determination processing performed by a CPU 201 in shutdown processing in this embodiment. In step S1201, the CPU 201 determines whether the received instruction is a shutdown instruction via the network. If YES in step S2101, the process advances to step S1202. If NO in step S2101, the process advances to step S1203. In step S1202, upon determining that the transmission source IP address of the UDP packet of the shutdown instruction is the one registered as a setting, the CPU 201 determines to make a shift to the power OFF state. If NO in step S1202, the CPU 201 determines to make a shift to the quick OFF state.

In step S1203, the CPU 201 determines whether validity setting has been made for the quick OFF state. If YES in step S1203, the CPU 201 determines to make a shift to the quick OFF state. If NO in step S1203, the CPU 201 determines to make a shift to the power OFF state.

As described above, according to the image processing apparatus described in this embodiment, it is possible to selectively use the power OFF state and quick OFF state of the image processing apparatus without determining, on the shutdown instruction transmission side, whether to make a shift to the quick OFF state or the power OFF state. Note that the embodiment is configured to use the transmission source IP address of a UDP packet as a shutdown instruction transmission source. Obviously, however, this arrangement is a merely an example, and the present invention is not limited to it.

<Seventh Embodiment>

The seventh embodiment will be described next with reference to FIG. 13. In the sixth embodiment, the image processing apparatus determines, based on a shutdown instruction transmission source, whether to shift to the power OFF state or the quick OFF state. For example, in a company setting holidays on Saturday and Sunday, there may be a demand for shifting an image processing apparatus to the power OFF state in Friday night in order to reduce the power consumed by the image processing apparatus during the holidays. This embodiment will therefore exemplify an image processing apparatus configured to shift to the power OFF state when accepting a shutdown instruction via the network within a preset reception date and time period. An image processing apparatus 1 according to this embodiment is configured to register, as a setting, a date and time range in which the power OFF state is set in response to a shutdown instruction. The user registers a target date and time range in advance by performing predetermined operation with an operation unit 5. The user may register one or a plurality of date and time ranges.

Figure 13:
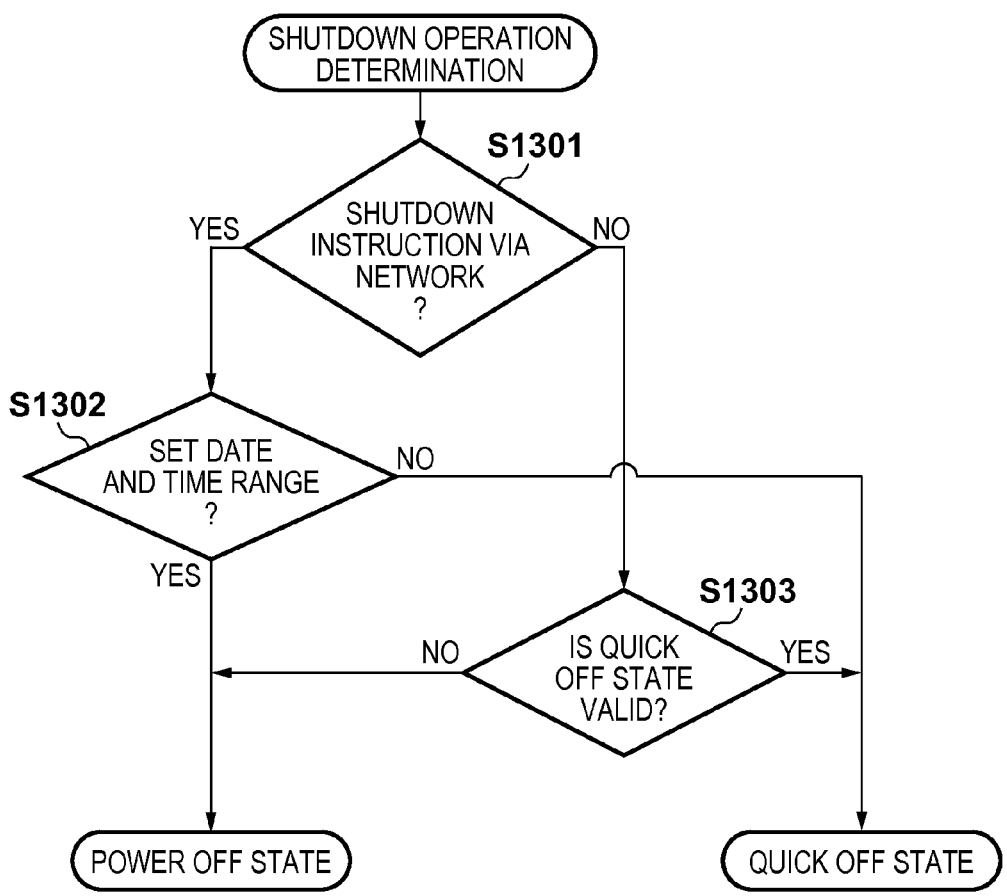
FIG. 13 is a flowchart showing a processing procedure for deciding a shift destination state at the time of shutdown according to the seventh embodiment.

FIG. 13 shows shift destination state determination processing performed by a CPU 201 in shutdown processing in this embodiment. In step S1301, the CPU 201 determines whether the received instruction is a shutdown instruction via the network. If YES in step S1301, the process advances to step S1302. If NO in step S1301, the process advances to step S1303. In step S1302, the CPU 201 determines whether the current date and time is included in the date and time range set as a target date and time range in which the apparatus shifts to the power OFF state. If YES in step S1302, the apparatus shifts to the power OFF state. If NO in step S1302, the CPU 201 determines to make a shift to the quick OFF state. In step S1303, the CPU 201 determines whether validity setting has been made for the quick OFF state. If YES in step S1303, the CPU 201 determines to make a shift to the quick OFF state. If NO in step S1303, the CPU 201 determines to make a shift to the power OFF state.

As described above, according to the image processing apparatus of this embodiment, it is possible to selectively use the power OFF state and quick OFF state of the image processing apparatus in accordance with the reception date and time of a shutdown instruction.

<Eighth Embodiment>

The eighth embodiment will be described next with reference to FIG. 14. In the sixth embodiment, the image processing apparatus determines, based on the transmission source of a shutdown instruction, whether to shift to the power OFF state or the quick OFF state. However, the eighth embodiment determines, based on the transmission destination of a shutdown instruction, whether to set the power OFF state or the quick OFF state. This embodiment will therefore exemplify an image processing apparatus configured to shift to the power OFF state upon receiving a shutdown instruction to a predetermined transmission destination. An image processing apparatus 1 of the embodiment is configured to monitor the reception of the UDP packets of shutdown instructions via two different UDP ports on a network interface 210. One port is used for an instruction to make a shift to the power OFF state. The other port is used for an instruction to make a shift to the quick OFF state. Upon receiving the UDP packet of a shutdown instruction via the network interface 210, a CPU 201 determines, based on the destination port number of the UDP packet, whether to make a shift to the power OFF state or the quick OFF state.

Figure 14:
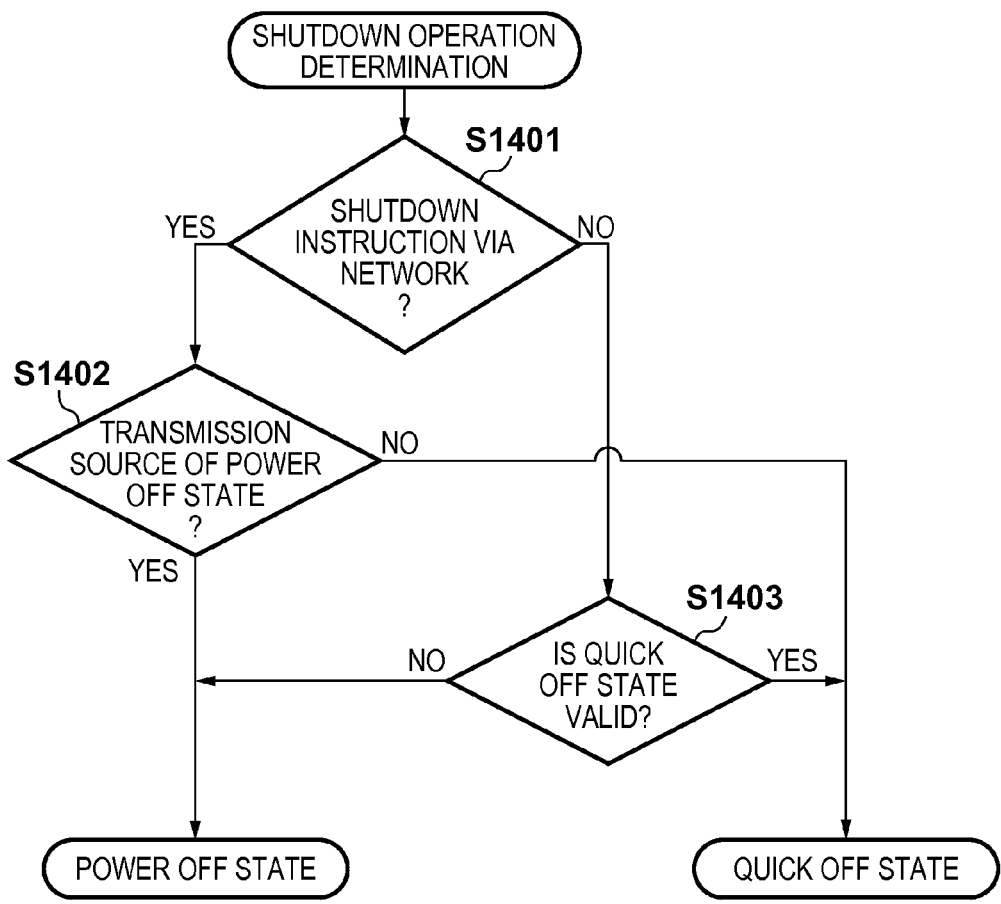
FIG. 14 is a flowchart showing a processing procedure for deciding a shift destination state at the time of shutdown according to the eighth embodiment.

FIG. 14 shows shift destination state determination processing performed by the CPU 201 in shutdown processing in this embodiment. In step S1401, the CPU 201 determines whether the received instruction is a shutdown instruction via the network. If YES in step S1401, the process advances to step S1402. If NO in step S1401, the process advances to step S1403. In step S1402, the CPU 201 determines whether the transmission destination of the UDP packet of the received shutdown instruction is the predetermined port for an instruction to make a shift to the power OFF state. If YES in step S1402, the apparatus shifts to the power OFF state. If NO in step S1402, the CPU 201 determines to make a shift to the quick OFF state. In step S1403, the CPU 201 determines whether validity setting has been made for the quick OFF state. If such setting has been made, the CPU 201 determines to make a shift to the quick OFF state. If such setting has not been made, the CPU 201 determines to make a shift to the power OFF state.

As described above, according to the image processing apparatus described in this embodiment, it is possible to selectively use the power OFF state and quick OFF state of the image processing apparatus in accordance with the transmission destination of a shutdown instruction. Note that this embodiment uses a UDP port as the transmission destination of a shutdown instruction which is to be used for shift destination state determination. Obviously, however, this arrangement is merely an example. For example, one image processing apparatus may be configured to include a plurality of network interfaces and perform determination based on a network interface as a transmission destination.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-150338 filed on Jul. 6, 2011, which is hereby incorporated by reference herein in its entirety.

What is claimed is:

1. A data processing apparatus which has a power off state and a power saving state, the apparatus comprising:
 a power switch constructed to receive a power off instruction to turn off the data processing apparatus, from a user;
 a receiving unit constructed to receive a power off instruction to turn off the data processing apparatus, from an external apparatus;
 a setting unit constructed to set information indicating a state to which the data processing apparatus is to be shifted when the power off instruction is received from the user via the power switch; and
 a control unit constructed to shift the data processing apparatus to the power saving state in a case where the power off instruction is received from the user via the power switch and the information set by the setting unit indicates the power saving state, to shift the data processing apparatus to the power off state in a case where the power off instruction is received from the user via the power switch and the information set by the setting unit indicates the power off state, and to shift the data processing apparatus to the power off state in a case where the power off instruction is received from the external apparatus via the receiving unit.

2. The apparatus according to claim 1, wherein before the data processing apparatus is shifted to the power saving state, a system is rebooted.

3. The apparatus according to claim 1, further comprising a second setting unit constructed to set a second information for temporarily disabling a shift to the power saving state,
 wherein in a case where the power off instruction received from the external apparatus via the receiving unit, said control unit shifts the data processing apparatus to the power off state when the second information set by said second setting unit, and shifts the data processing apparatus to the power saving state when the second information is not set by the second setting unit.

4. The apparatus according to claim 1, wherein in a case that the power off instruction is from the external apparatus via the receiving unit, said control unit shifts the data processing apparatus to the power off state when a transmission source of the power off instruction is a predetermined external apparatus, and shifts the data processing apparatus to the power saving state when a transmission source of the power off instruction is not the predetermined external apparatus.

5. The apparatus according to claim 1, wherein in a case where the power off instruction is received from the external apparatus via the receiving unit, said control unit shifts the data processing apparatus to the power off state when a reception date and time of the power off instruction received from the external apparatus falls within a predetermined reception date and time range, and shifts the data processing apparatus to the power saving state when a reception date and time of the power off instruction received from the external apparatus falls outside the predetermined reception date and time range.

6. The apparatus according to claim 1, wherein in a case where the power off instruction is received from the external apparatus via the receiving unit, said control unit shifts the data processing apparatus to the power off state when a transmission destination of the power off instruction received from the external apparatus is a predetermined port, and shifts the data processing apparatus to the power saving state when a transmission destination of the power off instruction received from the external apparatus is not the predetermined port.

7. The apparatus according to claim 1, wherein the control unit executes a shutdown processing before the data processing apparatus is shifted to the power off state.

8. The apparatus according to claim 1, wherein the power saving state is an S3 state of ACPI standard.

9. The apparatus according to claim 1, wherein in the power saving state, the power is supplied to a memory which is a work memory of the control unit.

10. The apparatus according to claim 9, wherein in the power saving state, the memory retains a program state of previously stored program.

11. The apparatus according to claim 1, wherein in the saving state, the power supply to the receiving unit is stopped.

12. The apparatus according to claim 1, wherein in the power off state, the power supply to a memory which is a work memory of the control unit is stopped.

13. A method for controlling a data processing apparatus which is a power off state and a power saving state, the method comprising:
 receiving a power off instruction to turn off the data processing apparatus, from a user via a power switch;
 receiving a power off instruction to turn off the data processing apparatus, from an external apparatus via a receiving unit;
 setting information indicating a state to which the data processing apparatus is to be shifted when the power off instruction is received from the user via the power switch; and
 shifting the data processing apparatus to the power saving state in a case where the power off instruction is received from the user via the power switch and the set information indicates the power saving state, shifting the data processing apparatus to the power off state in a case where the power off instruction is received from the user via the power switch and is the set information indicates the power off state, and shifting the data processing apparatus to the power off state in a case where the power off instruction is received from the external apparatus via the receiving unit.

14. A non-transitory computer-readable storage medium storing a computer program for causing a computer to execute each step in a method for controlling an data processing apparatus defined in claim 13.

15. A printing apparatus comprising:
 a power switch constructed to transit to an On state or an Off state in response to a user operation;
 a first receiving unit constructed to receive an instruction to turn off the printing apparatus, via a network from an external apparatus;
 a setting unit constructed to set information indicating a state to which the printing apparatus is to be shifted when the power switch is transited to the Off state;
 a second receiving unit constructed to receive an instruction to disable a setting content set by the setting unit via the network from an external apparatus; and
 a control unit constructed to shift the printing apparatus to the power saving state in a case where the power switch is transited to the Off state and the information set by the setting unit indicates the power saving state, to shift the printing apparatus to the power off state in a case where the power switch is transited to the Off state and the information set by the setting unit indicates the power off state, and to shift the printing apparatus to the power off state in a case where the instruction to disable the setting content is received by the second receiving unit.

16. The apparatus according to the claim 15, wherein the control unit shifts the printing apparatus to the power saving state in a case where the first receiving unit is received the instruction to turn off the printing apparatus, the setting content set by the setting unit is not been disabled the information set by the setting unit indicates the power saving state, and shifts the printing apparatus to the power off state in a case where the first receiving unit is received the instruction to turn off the printing apparatus, the setting content set by the setting unit is not been disabled and the information set by the setting unit indicates the power off state.

17. The apparatus according to the claim 15, wherein the control unit executes a shutdown processing before the printing apparatus is shifted to the power off state.

18. The apparatus according to the claim 15, wherein the control unit executes the reboot processing before the printing apparatus is shifted to the power saving state, and shifts the printing apparatus to the power saving state after executing the reboot processing.

19. The apparatus according to the claim 15, wherein the power saving state is an S3 state of ACPI standard.

20. The apparatus according to the claim 15, wherein in the power saving state, the power supply to a memory is maintained, the memory being a work memory of a CPU controlling an entirety of the printing apparatus.

21. The apparatus according to the claim 20, wherein in the saving state, the power supply to the receiving unit is stopped.

22. The apparatus according to the claim 20, wherein in the power state, the power supply to the memory is stopped.

23. A method for controlling a printing apparatus, the method comprising:
   transiting a power switch to an On state or an Off state in response to a user operation;
   receiving an instruction to turn off the printing apparatus, via a network from an external apparatus;
   setting information indicating a state to which the printing apparatus is to be shifted when the power switch is transited to the Off state;
   receiving an instruction to disable a setting content set in the setting step via the network from an external apparatus; and
   shifting the printing apparatus to the power saving state in a case where the power switch is transited to the Off state and the information set by the setting unit indicates the power saving state, shifting the printing apparatus to the power off state in a case where the power switch is transited to the Off state and is the information set by the setting unit indicates the power off state, and shifting the printing apparatus to the power off state in a case where the instruction to disable the setting content is received.

24. A non-transitory computer-readable storage medium storing a computer program for causing a computer to execute each step in a method for controlling a printing apparatus defined in claim 23.

* * * * *